US012645412B2

(12) United States Patent
Hasama

(10) Patent No.: US 12,645,412 B2
(45) Date of Patent: Jun. 2, 2026

(54) STORAGE MEDIUM THAT STORES PROGRAM THAT ALLOWS PRINTING RESULT TO BE RECORDED IN APPROPRIATE SUBSCRIPTION ACCOUNT, INFORMATION PROCESSING APPARATUS, AND CONTROL METHOD FOR INFORMATION PROCESSING APPARATUS

(71) Applicant: CANON KABUSHIKI KAISHA, Tokyo (JP)

(72) Inventor: Yuichi Hasama, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 18/601,145

(22) Filed: Mar. 11, 2024

(65) Prior Publication Data

US 2024/0319940 A1     Sep. 26, 2024

(30) Foreign Application Priority Data

Mar. 23, 2023     (JP) ................................. 2023-046755

(51) Int. Cl.
*G06F 3/12*               (2006.01)
(52) U.S. Cl.
CPC .......... *G06F 3/1273* (2013.01); *G06F 3/1203* (2013.01); *G06F 3/1239* (2013.01); *G06F 3/1253* (2013.01); *G06F 3/1286* (2013.01); *G06F 3/1287* (2013.01)
(58) Field of Classification Search
None
See application file for complete search history.

(56) References Cited

U.S. PATENT DOCUMENTS

| | | | | |
|---|---|---|---|---|
| 7,660,871 B2 * | 2/2010 | Koh | ......................... | H04L 67/51 |
| | | | | 709/217 |
| 2020/0379741 A1 * | 12/2020 | Vidnovic | ................ | G06F 21/44 |
| 2021/0304337 A1 | 9/2021 | Shishido et al. | | |
| 2022/0321729 A1 * | 10/2022 | Hirose | .................. | G06F 3/1224 |
| 2023/0333787 A1 * | 10/2023 | Bhaskaran | ........... | H04N 1/4433 |
| 2024/0319940 A1 * | 9/2024 | Hasama | ................ | G06F 3/1285 |

FOREIGN PATENT DOCUMENTS

JP            2021160104 A     10/2021

* cited by examiner

*Primary Examiner* — Darryl V Dottin
(74) *Attorney, Agent, or Firm* — ROSSI, KIMMS & McDOWELL LLP

(57)               ABSTRACT

A mechanism that allows a printing result to be recorded in an appropriate subscription account is provided. A non-transitory computer-readable storage medium storing a program for causing an information processing apparatus to execute a process that causes a display unit of the information processing apparatus to display a printing setting user interface for causing a printing apparatus to execute printing, the program comprising software code adapted to perform causing the information processing apparatus to obtain account information for a subscription service available to a user who operates the information processing apparatus, and causing the display unit of the information processing apparatus to display the printing setting user interface including an object for allowing the user to select account information, in which a printing result of printing based on a printing setting set on the printing setting user interface is recorded, from among the account information for the subscription service obtained.

8 Claims, 15 Drawing Sheets

*FIG. 5*

| CONTRACT NUMBER | PLAN NAME | MAXIMUM NUMBER OF PAGES | FEE |
|---|---|---|---|
| 111111 | HOME SUBSCRIPTION PLAN | 10 PAGES/MONTH | 1500 YEN/MONTH |
| 222222 | CORPORATE SUBSCRIPTION PLAN | 1000 PAGES/MONTH | 5000 YEN/MONTH |

Figure 7:
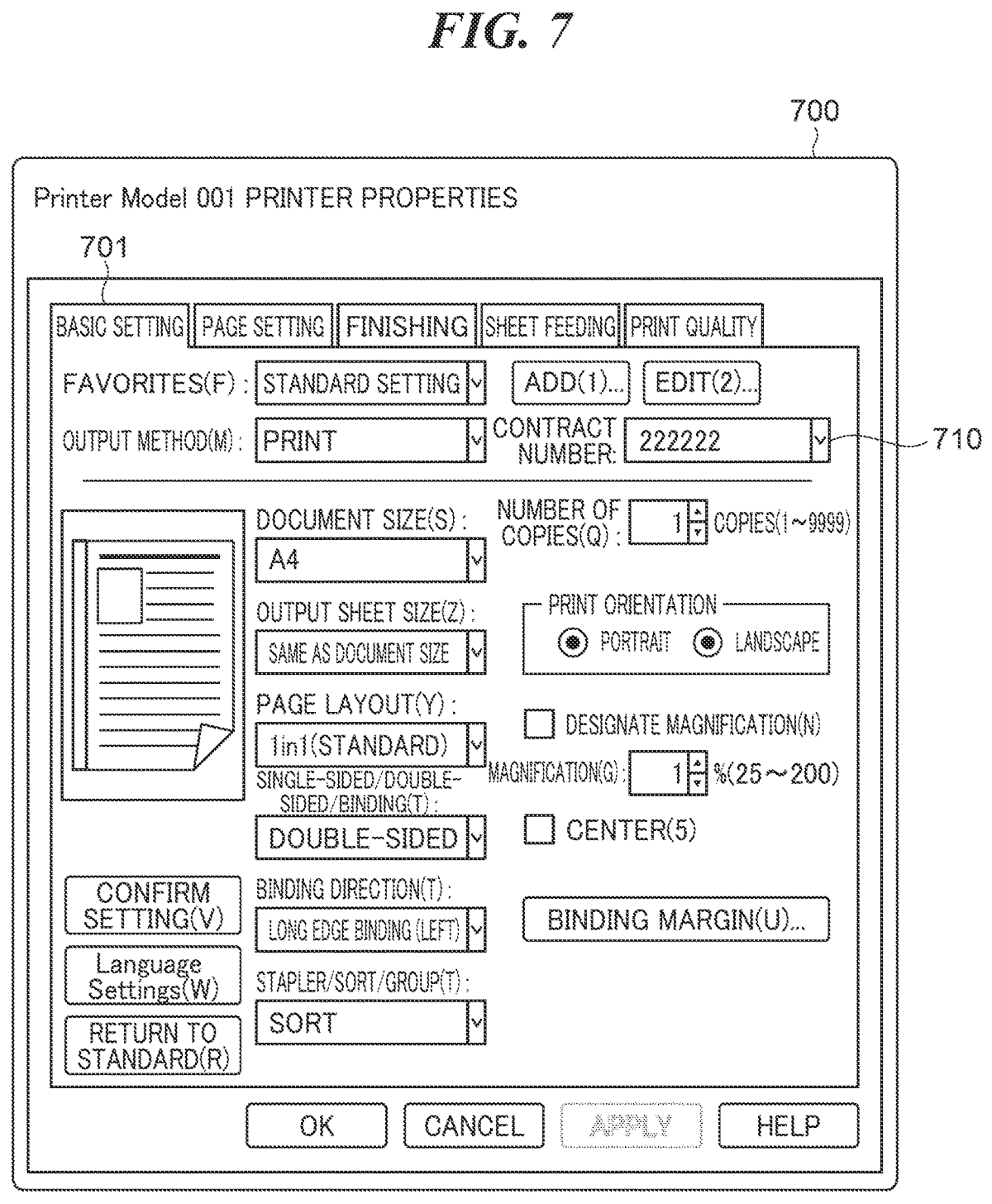

Printer Model 001 PRINTER PROPERTIES

701

| BASIC SETTING | PAGE SETTING | FINISHING | SHEET FEEDING | PRINT QUALITY |

FAVORITES(F) : STANDARD SETTING ☑   [ADD(1)...]   [EDIT(2)...]

OUTPUT METHOD(M) : PRINT ☑   CONTRACT NUMBER: 222222 ☑     710

DOCUMENT SIZE(S) :    NUMBER OF COPIES(Q) : [ 1 ☐ ] COPIES(1~9999)

A4 ☑

OUTPUT SHEET SIZE(Z) :

SAME AS DOCUMENT SIZE ☑

┌─ PRINT ORIENTATION ─┐
   ◉ PORTRAIT    ◉ LANDSCAPE

PAGE LAYOUT(Y) :

1in1(STANDARD) ☑

☐ DESIGNATE MAGNIFICATION(N)

SINGLE-SIDED/DOUBLE-SIDED/BINDING(T) :

MAGNIFICATION(G): [ 1 ☐ ] %(25~200)

DOUBLE-SIDED ☑

☐ CENTER(5)

[CONFIRM SETTING(V)]

BINDING DIRECTION(T) :

LONG EDGE BINDING (LEFT) ☑

[ BINDING MARGIN(U)... ]

[Language Settings(W)]

STAPLER/SORT/GROUP(T) :

[RETURN TO STANDARD(R)]

SORT ☑

[ OK ]   [ CANCEL ]   [ APPLY ]   [ HELP ]

1

STORAGE MEDIUM THAT STORES PROGRAM THAT ALLOWS PRINTING RESULT TO BE RECORDED IN APPROPRIATE SUBSCRIPTION ACCOUNT, INFORMATION PROCESSING APPARATUS, AND CONTROL METHOD FOR INFORMATION PROCESSING APPARATUS

BACKGROUND OF THE INVENTION

Field of the Invention

The present invention relates to a storage medium that stores a program, an information processing apparatus, and a control method for the information processing apparatus.

Description of the Related Art

In recent years, with the expansion of telework, the use of a form of work where work is performed from home, so-called work from home is increasing. One form of work from home is to take home a notebook personal computer (hereinafter, simply referred to as "a PC") used at company, connect the PC to a home network, and perform work. In this case, by connecting a company network and the home network with a virtual private network (VPN), it is possible to safely access the company network even from home.

On the other hand, due to the reduction in initial investment and the ease of budget management, a printer subscription service (hereinafter, "subscription service" is referred to as "subscription") is being used (see Japanese Laid-Open Patent Publication (kokai) No. 2021-160104). With a printer subscription, for example, by paying a fixed monthly fee, a user is able to perform printing up to a predetermined maximum number of pages without paying an additional fee. In addition, in the printer subscription, there are a plurality of subscription plans with different maximum numbers of pages, and the user is able to select an appropriate subscription plan depending on the number of printed pages per month. For example, as a subscription plan for use at company, a corporate subscription plan with a large maximum number of pages is contracted, and as a subscription plan for use at home, a home subscription plan with a relatively small maximum number of pages is contracted.

In the case that a user who has subscribed to (has contracted) a home subscription plan for private use uses his or her home printer to perform printing of work-related documents or the like while working from home, it is desirable that a printing result of such printing (the printing of work-related documents or the like) is recorded in an account of a corporate subscription plan that the company side has contracted. However, the printing result of the printing of work-related documents or the like is actually recorded in an account of the home subscription plan that the user has contracted. As described above, conventionally, an issue occurs where the printing result is not recorded in an appropriate subscription account.

SUMMARY OF THE INVENTION

The present invention provides a mechanism that allows a printing result to be recorded in an appropriate subscription account.

Accordingly, the present invention provides a non-transitory computer-readable storage medium storing a program for causing an information processing apparatus to execute a process that causes a display unit of the information processing apparatus to display a printing setting user interface for causing a printing apparatus to execute printing, the program comprising software code adapted to perform causing the information processing apparatus to obtain account information for a subscription service available to a user who operates the information processing apparatus, and causing the display unit of the information processing apparatus to display the printing setting user interface including an object for allowing the user to select account information, in which a printing result of printing based on a printing setting set on the printing setting user interface is recorded, from among the account information for the subscription service obtained.

According to the present invention, it is possible to record the printing result in the appropriate subscription account.

Further features of the present invention will become apparent from the following description of exemplary embodiments with reference to the attached drawings.

BRIEF DESCRIPTION OF THE DRAWINGS

FIG. 5 is a plan table that shows an example of a subscription plan for the printer.

FIG. 7 is a diagram that shows an example of the printing setting UI displayed on a display unit shown in FIG. 2A.

DESCRIPTION OF THE EMBODIMENTS

The present invention will now be described in detail below with reference to the accompanying drawings showing embodiments thereof.

Hereinafter, a preferred embodiment of the present invention will be described in detail with reference to the accompanying drawings.

Figure 1:
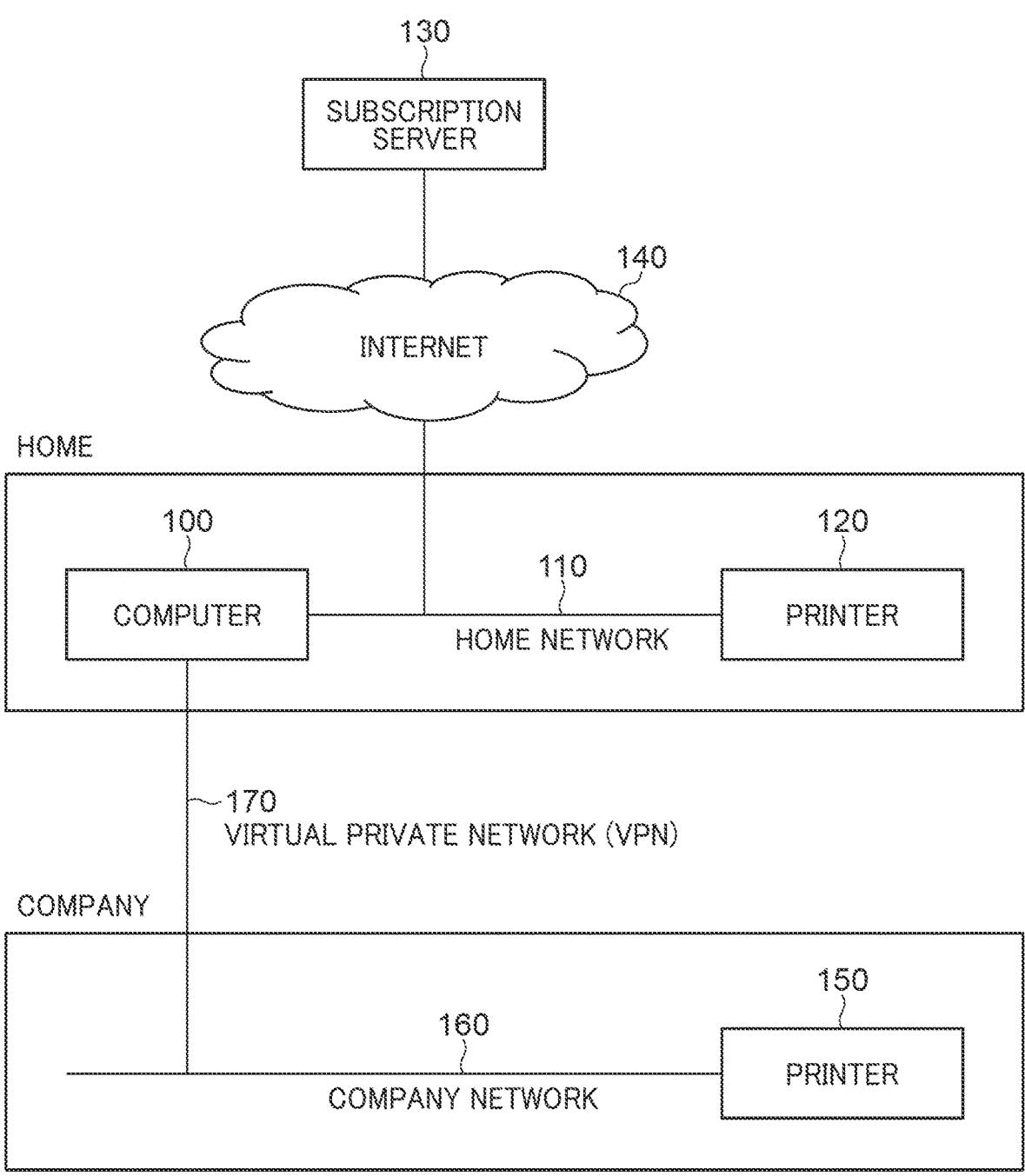
FIG. 1 is a diagram that shows a schematic configuration of a printing system including a computer functioning as an information processing apparatus according to a preferred embodiment of the present invention.

FIG. 1 is a diagram that shows a schematic configuration of a printing system including a computer 100 functioning as an information processing apparatus according to the preferred embodiment of the present invention. As shown in FIG. 1, the printing system includes the computer 100 functioning as the information processing apparatus, a subscription server 130, and printers 120 and 150 functioning as printing apparatuses.

The computer 100 and the printer 120 are installed at home of a user. The computer 100 and the printer 120 are communicably connected to each other via a home network 110. The home network 110 is connected to the Internet 140 via a router (not shown). It should be noted that, in the preferred embodiment of the present invention, it is assumed that a contract for a home subscription plan 501 shown in FIG. 5, which will be described below, has been concluded between the user and a printer subscription service provider.

On the other hand, the printer 150 is installed in a company. The printer 150 is connected to a company network 160. The company network 160 is connected to the Internet 140 via a router (not shown) and a VPN server (not shown). It should be noted that the home network 110 and the company network 160 are, for example, local area networks (LANs), but they may be wired or wireless connections. In addition, in the preferred embodiment of the present invention, it is assumed that a contract for a corporate subscription plan 502 shown in FIG. 5, which will be described below, has been concluded between the company and the printer subscription service provider.

The computer 100 is virtually connected to the company network 160 via a virtual private network (a VPN) 170. As a result, the computer 100 is able to safely access data on the company network 160 via the Internet (not shown). It should be noted that the computer 100 is able to switch ON/OFF of the connection to the virtual private network 170 as specified by the user.

The subscription server 130 is a server that provides a printer subscription service (hereinafter, referred to as "a printer subscription"). For example, the subscription server 130 provides a flat rate print service. In the flat rate print service, during a contract period, the user is able to use the printer for a flat rate (a fixed fee), no matter how many pages the user has printed, as long as the number of pages printed by the user does not exceed the number of pages corresponding to user's contracted plan. The subscription server 130 is managed by the printer subscription service provider and is connected to the Internet 140. In this way, the subscription server 130 is communicably connected to the computer 100 and the printer 120 via the Internet 140 and the home network 110.

Figure 2A:
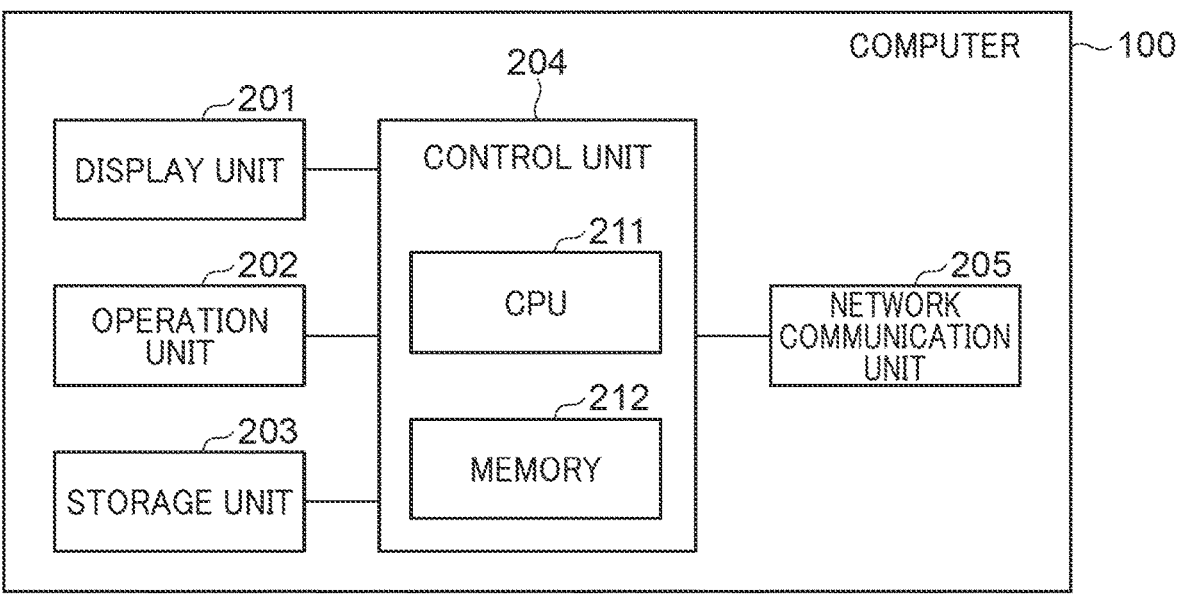
FIGS. 2A and 2B are block diagrams that show hardware configurations of the computer and a subscription server that are shown in FIG. 1.

FIG. 2A is a block diagram that shows a hardware configuration of the computer 100. As shown in FIG. 2A, the computer 100 includes a display unit 201, an operation unit 202, a storage unit 203, a control unit 204, and a network communication unit 205, and the control unit 204 includes a central processing unit (a CPU) 211 and a memory 212.

The display unit 201 is a display device such as a liquid crystal display (an LCD). The operation unit 202 is an input device including, for example, a mouse and a keyboard that accept operations performed by the user. The storage unit 203 is a storage medium such as a hard disk drive (an HDD) or a solid state drive (an SSD), and stores various kinds of software necessary for the operations of the computer 100.

The control unit 204 performs overall control of the computer 100 by causing the CPU 211 to execute predetermined programs stored in the memory 212 and the storage unit 203. In addition, the control unit 204 causes the CPU 211 to load a predetermined software program stored in the storage unit 203 into the memory 212, thereby executing various kinds of processing, which will be described below. The network communication unit 205 is connected to an external network such as the Internet 140, and performs input/output of data from/to external apparatuses.

Figure 2B:
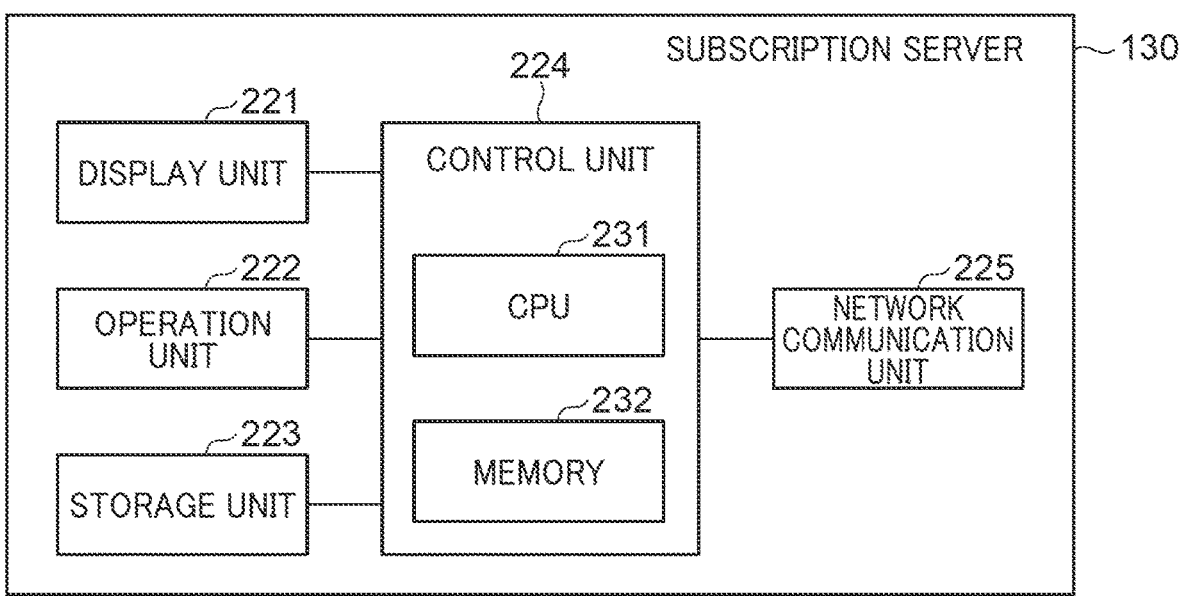

FIG. 2B is a block diagram that shows a hardware configuration of the subscription server 130. As shown in FIG. 2B, the subscription server 130 includes a display unit 221, an operation unit 222, a storage unit 223, a control unit 224, and a network communication unit 225, and the control unit 224 includes a CPU 231 and a memory 232.

Although the subscription server 130 and the computer 100 execute different programs (different processing), they have almost the same hardware configuration. Therefore, the description of the hardware configuration of the subscription server 130 is similar to the description of the hardware configuration of the computer 100, and the description of the hardware configuration of the subscription server 130 will be omitted here.

Figure 3A:
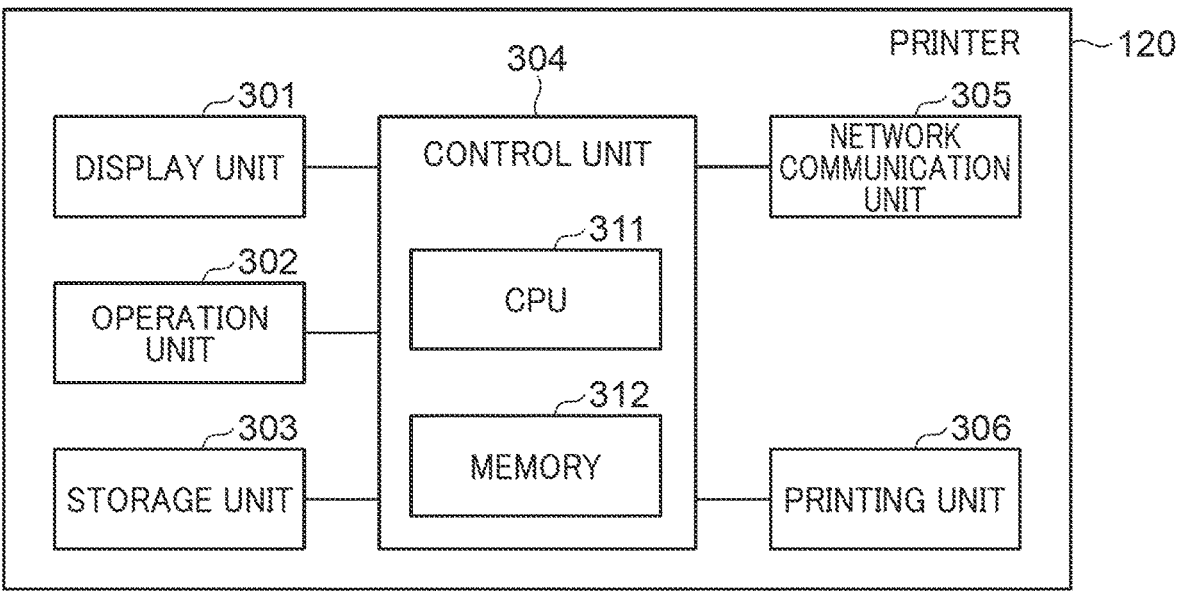
FIGS. 3A and 3B are block diagrams that show hardware configurations of printers that are shown in FIG. 1.

FIG. 3A is a block diagram that shows a hardware configuration of the printer 120. As shown in FIG. 3A, the printer 120 includes a display unit 301, an operation unit 302, a storage unit 303, a control unit 304, a network communication unit 305, and a printing unit 306, and the control unit 304 includes a CPU 311 and a memory 312.

The display unit 301 is a display device such as an LCD. The operation unit 302 is an input means including, for example, a touch panel, buttons, switches, and the like that accept operations performed by the user. The touch panel is disposed to overlap a display panel of the display device, and the touch panel and the display device cooperate to function as an operation means for accepting user operations. The storage unit 303 is a storage medium such as an HDD or an SSD, and stores various kinds of software necessary for the operations of the printer 120.

The control unit 304 performs overall control of the printer 120 by causing the CPU 311 to execute predetermined programs stored in the memory 312 and the storage unit 303. In addition, the control unit 304 causes the CPU 311 to load a predetermined software program stored in the storage unit 303 into the memory 312, thereby executing various kinds of processing, which will be described below.

The network communication unit 305 is connected to the external network such as the Internet 140, and performs input/output of data from/to the external apparatuses. The printing unit 306 converts digital data stored in the storage unit 303 or the memory 312 into an image according to an instruction from the control unit 304, and prints the image on recording sheets (printing sheets). The printing method is not limited, and for example, an inkjet method or an electrophotographic method may be used.

Figure 3B:
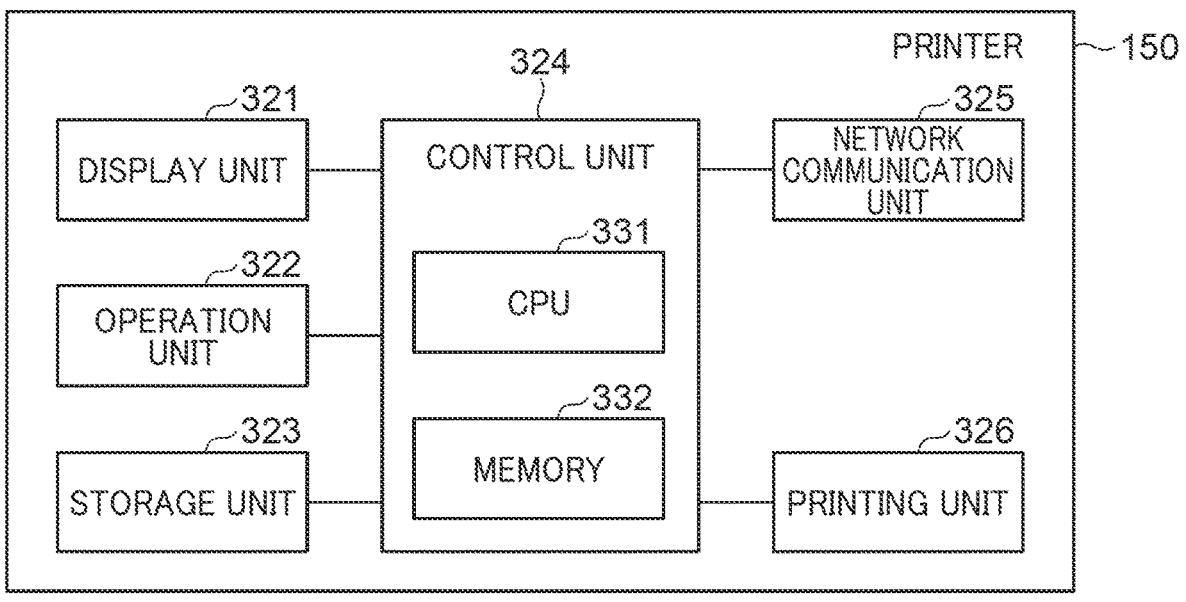

FIG. 3B is a block diagram that shows a hardware configuration of the printer 150. As shown in FIG. 3B, the printer 150 includes a display unit 321, an operation unit 322, a storage unit 323, a control unit 324, a network communication unit 325, and a printing unit 326, and the control unit 324 includes a CPU 331 and a memory 332. It should be noted that since the printer 150 and the printer 120 have almost the same hardware configuration, the description of the hardware configuration of the printer 150 is similar to the description of the hardware configuration of the printer 120, and the description of the hardware configuration of the printer 150 will be omitted here.

Figure 4:
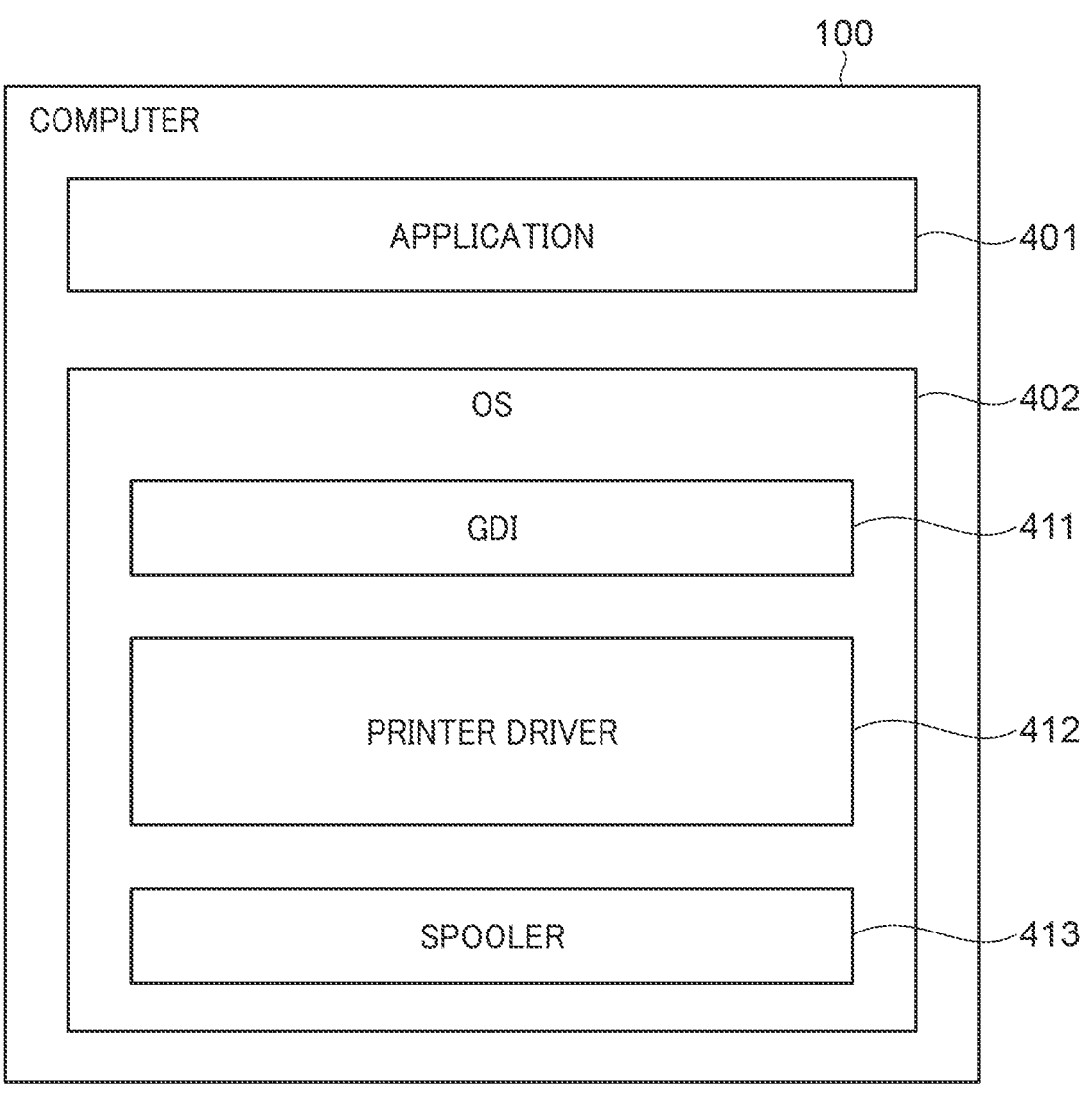
FIG. 4 is a block diagram that shows a configuration of print-related software of the computer shown in FIG. 1.

FIG. 4 is a block diagram that shows a configuration of print-related software of the computer 100 shown in FIG. 1. As shown in FIG. 4, the print-related software includes an application 401 and an operating system (an OS) 402. In addition, the OS 402 includes a graphic device interface (a GDI) 411, a printer driver 412, and a spooler 413.

The application 401 refers to any software such as document creation software or spreadsheet software, and is assumed to include a printing function. By executing the printing function included in the application 401, the user is able to print information and the like displayed on the display unit 201 of the computer 100 by using the printer 120. The printing function included in the application 401 is realized by calling an interface provided by the GDI 411 out.

The OS 402 is software that controls the basic operations of the computer 100. The application 401 and the printer driver 412 are managed by the OS 402, and become usable by being installed on the OS 402. The GDI 411 is a component that provides an interface related to rendering such as printing to the external apparatus. The printer driver 412 generates rendering data (page description language (PDL)) that can be interpreted by the printer 120 during printing. In addition, the printer driver 412 causes the display unit 201 to display a printing setting user interface (a printing setting UI) 700 shown in FIG. 7, which will be described below, for causing the printer 120 to execute printing. The spooler 413 transmits the PDL generated by the printer driver 412 to the printer 120.

FIG. 5 is a plan table 500 that shows an example of a subscription plan for the printer. As shown in FIG. 5, the home subscription plan 501 and the corporate subscription plan 502 are available as the subscription plan. The maximum number of pages for the home subscription plan 501 is 10 pages per month, and the monthly fee for the home subscription plan 501 is 1,500 yen. The maximum number of pages for the corporate subscription plan 502 is 1000 pages per month, and the monthly fee for the corporate subscription plan 502 is 5,000 yen. It should be noted that the maximum number of pages indicates a threshold value for the number of printed pages per month determined for each plan. When the subscription plan shown in FIG. 5 is contracted, a contract number is assigned as subscription account information, and a printing result, etc. are managed by the subscription server 130.

Figure 6:
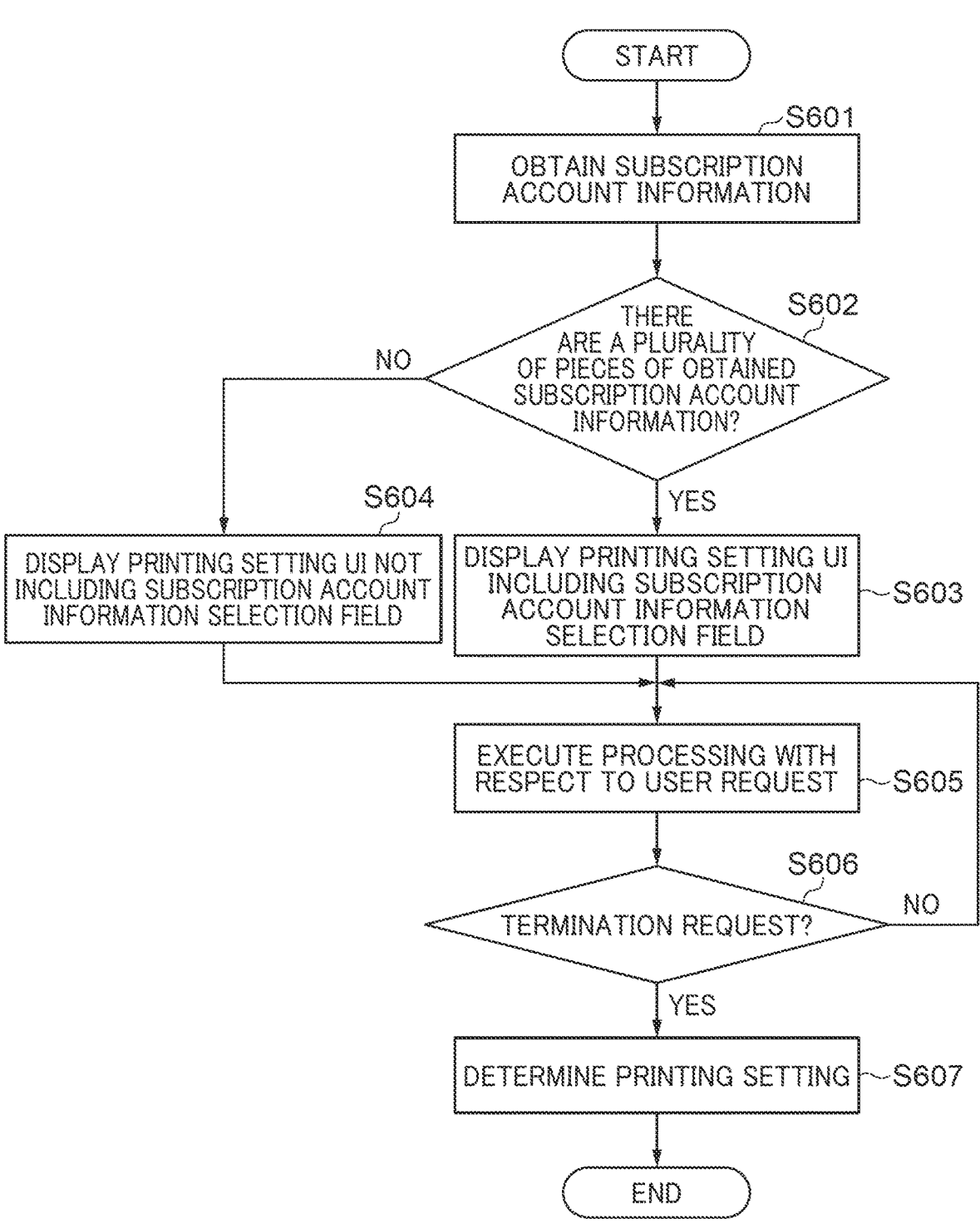
FIG. 6 is a flowchart that shows a procedure of a display control processing of a printing setting UI executed by the computer shown in FIG. 1.

FIG. 6 is a flowchart that shows a procedure of a display control processing of a printing setting UI executed by the computer 100 shown in FIG. 1. The display control processing shown in FIG. 6 is realized by the CPU 211 reading out a control program for the printer driver 412 stored in the storage unit 203 into the memory 212 and executing it. In addition, the display control processing shown in FIG. 6 is executed when the printer driver 412 receives, via the GDI 411, a request to display the printing setting UI outputted from the application 401.

As shown in FIG. 6, the CPU 211 obtains subscription account information corresponding to a user who has logged in to the computer 100 (S (step) 601). For example, the CPU 211 may obtain subscription account information, which has been registered in the printer driver 412 in advance. Further, the CPU 211 may obtain the subscription account information corresponding to the user who has logged in to the computer 100 from the subscription server 130 via the Internet 140. It should be noted that in S601, in the case that the user who has logged in to the computer 100 is able to use both an account of the home subscription plan 501 and an account of the corporate subscription plan 502, two pieces of subscription account information corresponding to the account of the home subscription plan 501 and the account of the corporate subscription plan 502 are obtained.

Next, the CPU 211 determines whether or not there are a plurality of pieces of obtained subscription account information (S602). In the case of being determined in S602 that there are a plurality of pieces of obtained subscription account information (a plurality of pieces of subscription account information are obtained), the CPU 211 causes the display unit 201 to display the printing setting UI 700 shown in FIG. 7 (S603). The printing setting UI 700 includes a plurality of tabs for switching screens, and in the printing setting UI, a screen corresponding to the selected tab is displayed. In FIG. 7, a screen corresponding to a basic setting tab 701 selected is displayed. The printing setting UI 700 includes a subscription account information selection field 710 for allowing the user to select from the plurality of pieces of subscription account information obtained in S601. As described above, in the preferred embodiment of the present invention, in the case that the plurality of pieces of subscription account information are obtained in S601, the printing setting UI 700 including the subscription account information selection field 710 is displayed on the display unit 201. For example, in the case that two pieces of subscription account information "11111" and "22222" are obtained in S601, the printing setting UI 700 including the subscription account information selection field 710, from which the two pieces of subscription account information "11111" and "22222" can be selected, is displayed on the display unit 201. It should be noted that "11111" is the subscription account information for the home subscription plan 501 and "22222" is the subscription account information for the corporate subscription plan 502. It should be noted that in the preferred embodiment of the present invention, although the configuration in which the subscription account information selection field 710 is displayed on the screen corresponding to the basic setting tab 701 has been described, the present invention is not limited to this configuration, and the subscription account information selection field 710 may be displayed on a screen corresponding to another tab. Next, the display control processing shown in FIG. 6 proceeds to S605, which will be described below.

In the case of being determined in S602 that one piece of subscription account information is obtained instead of the plurality of pieces of subscription account information, the CPU 211 causes the display unit 201 to display a printing setting UI that does not include the subscription account information selection field 710 (S604). It should be noted that this printing setting UI has the same configuration as the printing setting UI 700 described above, except that it does not include the subscription account information selection field 710.

Next, when the CPU 211 receives a user request such as a setting change request or a tab switching request from the user via the printing setting UI displayed in S603 or S604, the CPU 211 performs a processing with respect to the received user request (S605). Next, the CPU 211 determines whether or not a termination request has been received (S606). It should be noted that in the preferred embodiment of the present invention, the user is able to make a termination request, for example, by selecting an OK button on the printing setting UI. In the case of being determined in S606 that the termination request has not been received, the display control processing shown in FIG. 6 returns to S605. On the other hand, in the case of being determined in S606 that the termination request has been received, the display control processing shown in FIG. 6 proceeds to S607.

In S607, the CPU 211 determines a print setting set on respective screens of the printing setting UI. The CPU 211 returns the determined print setting to the application 401 via the GDI 411, and ends the display control processing shown in FIG. 6. After that, the computer 100 executes a print job data generating processing shown in FIG. 8 to generate print job data for causing the printer 120 to execute a printing processing.

Figure 8:
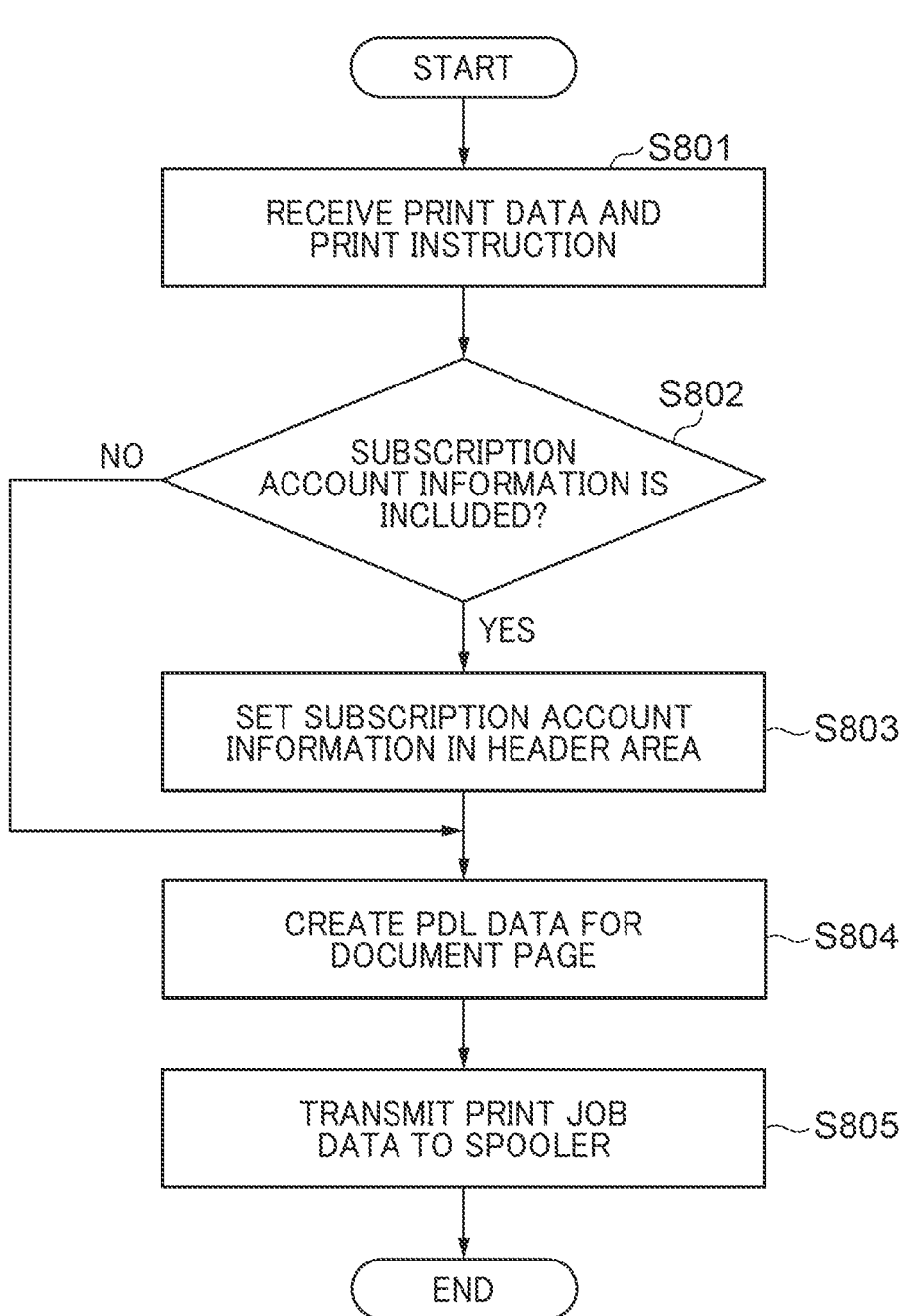
FIG. 8 is a flowchart that shows a procedure of a print job data generating processing executed by the computer shown in FIG. 1.

FIG. 8 is a flowchart that shows a procedure of the print job data generating processing executed by the computer 100 shown in FIG. 1. The print job data generating processing shown in FIG. 8 is realized by the CPU 211 reading out the control program for the printer driver 412 stored in the storage unit 203 into the memory 212 and executing it.

As shown in FIG. 8, first, the CPU 211 receives print data of a document to be printed and a print instruction from the application 401 via the GDI 411 (S801). The print instruction includes the print setting set on the printing setting UI 700. For example, in the case that the subscription account information is set by the subscription account information selection field 710 of the printing setting UI 700, the set subscription account information is included in the print instruction. In addition, in the case of being determined in S602 that one piece of subscription account information is obtained instead of the plurality of pieces of subscription account information, the subscription account information obtained in S601 is included in the print instruction.

Next, the CPU 211 determines whether or not the subscription account information is included in the received print instruction (S802). In the case of being determined in S802 that the subscription account information is not included in the received print instruction, the print job data generating processing proceeds to S804, which will be described below. On the other hand, in the case of being determined in S802 that the subscription account information is included in the received print instruction, the print job data generating processing proceeds to S803, which will be described below.

Figure 9:
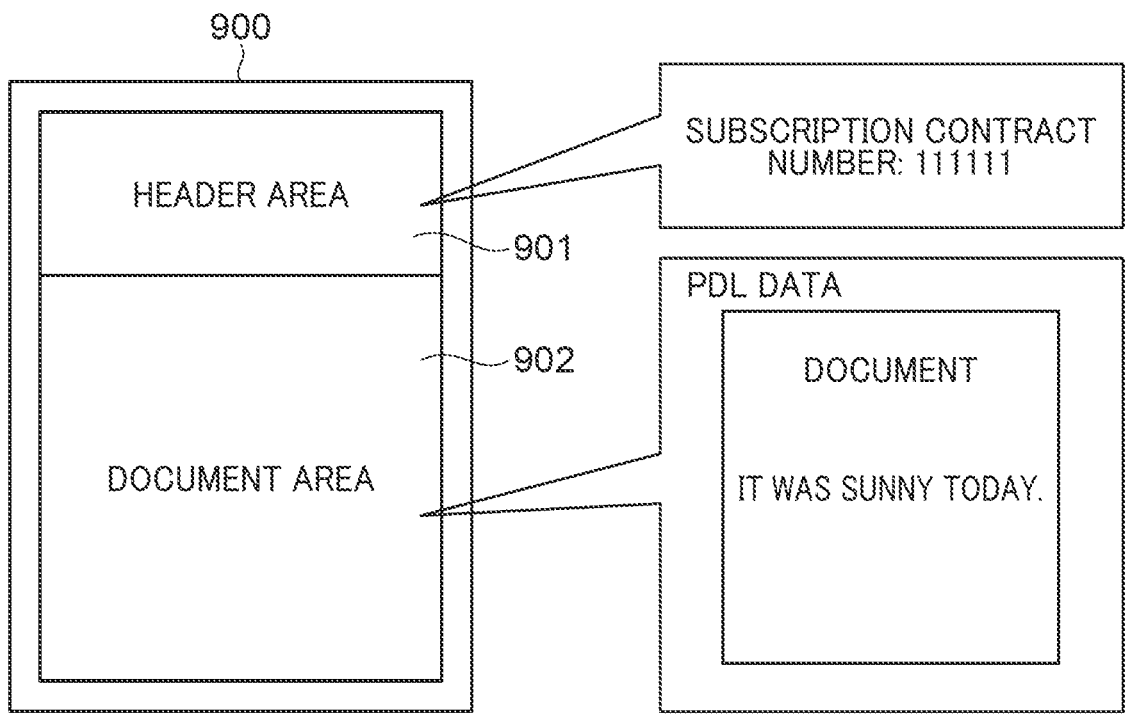
FIG. 9 is a diagram that shows a configuration of print job data generated by the computer shown in FIG. 1.

In S803, the CPU 211 sets the subscription account information, which is included in the print instruction, in a header area 901 of print job data 900 shown in FIG. 9. Next, the CPU 211 creates PDL data for the document page (S804). Specifically, the CPU 211 creates the PDL data for the document page by converting the print data of the document received in S801 into PDL. The CPU 211 sets this PDL data in a document area 902 of the print job data 900. In this manner, in the preferred embodiment of the present invention, in the case that the subscription account information is included in the received print instruction, the print job data 900, in which the subscription account information is set in the header area 901, is generated. On the other hand, in the case that the subscription account information is not included in the received print instruction, the print job data 900, in which the subscription account information is not set in the header area 901, is generated. Next, the CPU 211 transmits the print job data 900 to the spooler 413 (S805), and the print job data generating processing shown in FIG. 8 ends. The print job data 900 transmitted to the spooler 413 is transmitted to the printer 120.

Figure 10:
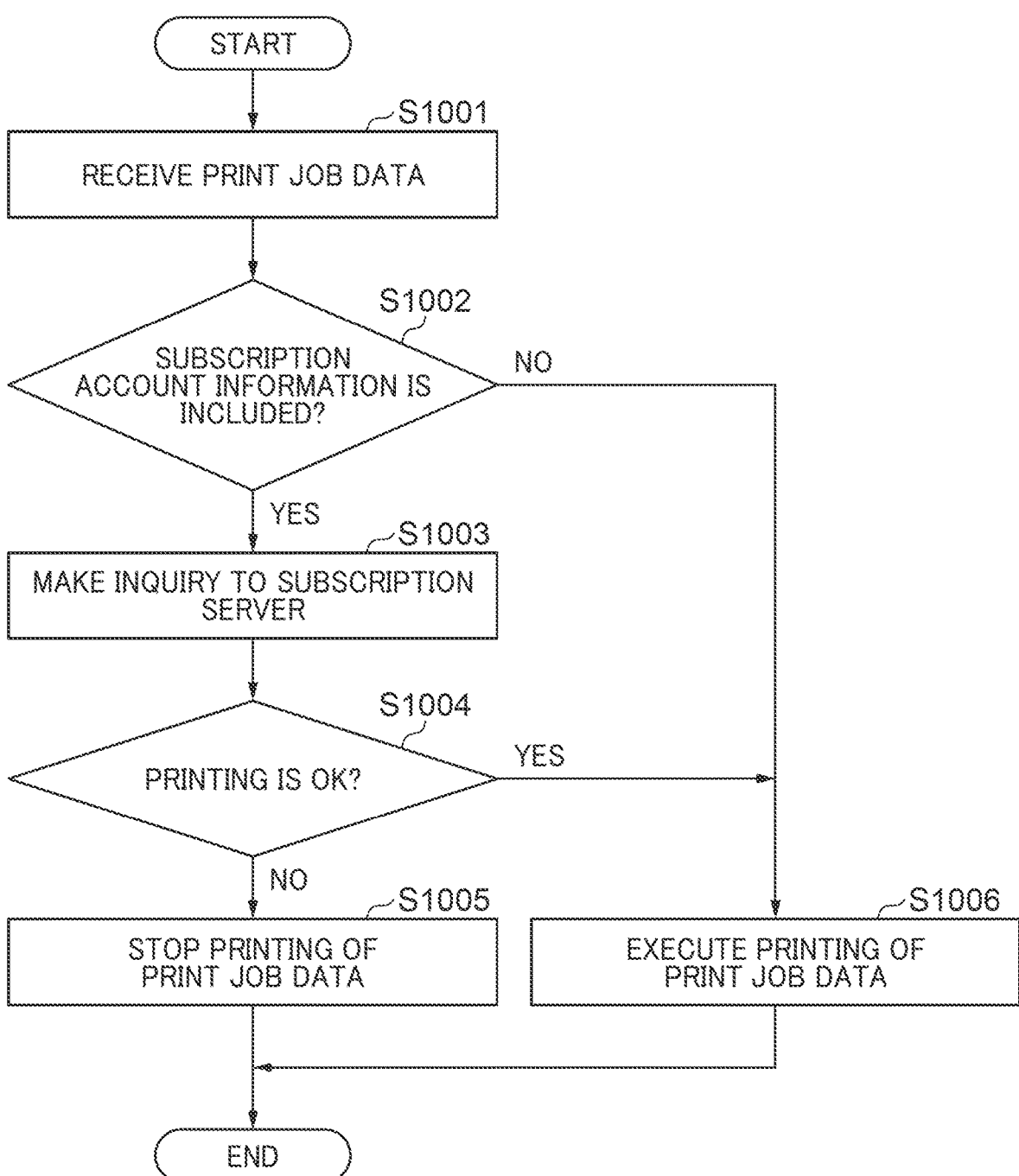
FIG. 10 is a flowchart that shows a procedure of a printing control processing executed by the printer shown in FIG. 1.

FIG. 10 is a flowchart that shows a procedure of a printing control processing executed by the printer 120 shown in FIG. 1. The printing control processing shown in FIG. 10 is realized by the CPU 311 reading out a software control program stored in the storage unit 303 into the memory 312 and executing it. It should be noted that in the preferred embodiment of the present invention, although the case that the printer 120 executes the printing control processing shown in FIG. 10 will be described, the printer 150, which has the same configuration as the printer 120, can also execute the printing control processing shown in FIG. 10 in the same manner.

As shown in FIG. 10, the CPU 311 receives the print job data 900 transmitted from the computer 100 (S1001). Next, the CPU 311 determines whether or not the subscription account information is included in the received print job data 900 (S1002).

In the case of being determined in S1002 that the subscription account information is included in the received print job data 900, the CPU 311 makes an inquiry to the subscription server 130 via the Internet 140 (S1003). Specifically, the CPU 311 transmits the subscription account information included in the print job data 900 to the subscription server 130, and makes an inquiry as to whether or not printing of the print job data 900 can be executed (the print job data 900 can be printed) in the subscription plan corresponding to this subscription account information. The subscription server 130 performs a response processing shown in FIG. 11, which will be described below, and transmits a notification to the computer 100 as a response to the above inquiry.

Next, the CPU 311 determines whether or not printing of the print job data 900 can be executed (printing of the print job data 900 is OK) based on the notification received from the subscription server 130 (S1004).

In the case of being determined in S1004 that printing of the print job data 900 cannot be executed (printing of the print job data 900 is NG), the CPU 311 stops printing of the print job data 900 (S1005), and the printing control processing ends.

On the other hand, in the case of being determined in S1004 that printing of the print job data 900 can be executed (printing of the print job data 900 is OK), the printing control processing proceeds to S1006. In addition, in the case of being determined in S1002 that the subscription account information is not included in the received print job data 900, the printing control processing proceeds to S1006. In S1006, the CPU 311 executes printing of the print job data 900. After that, the printing control processing ends.

Figure 11:
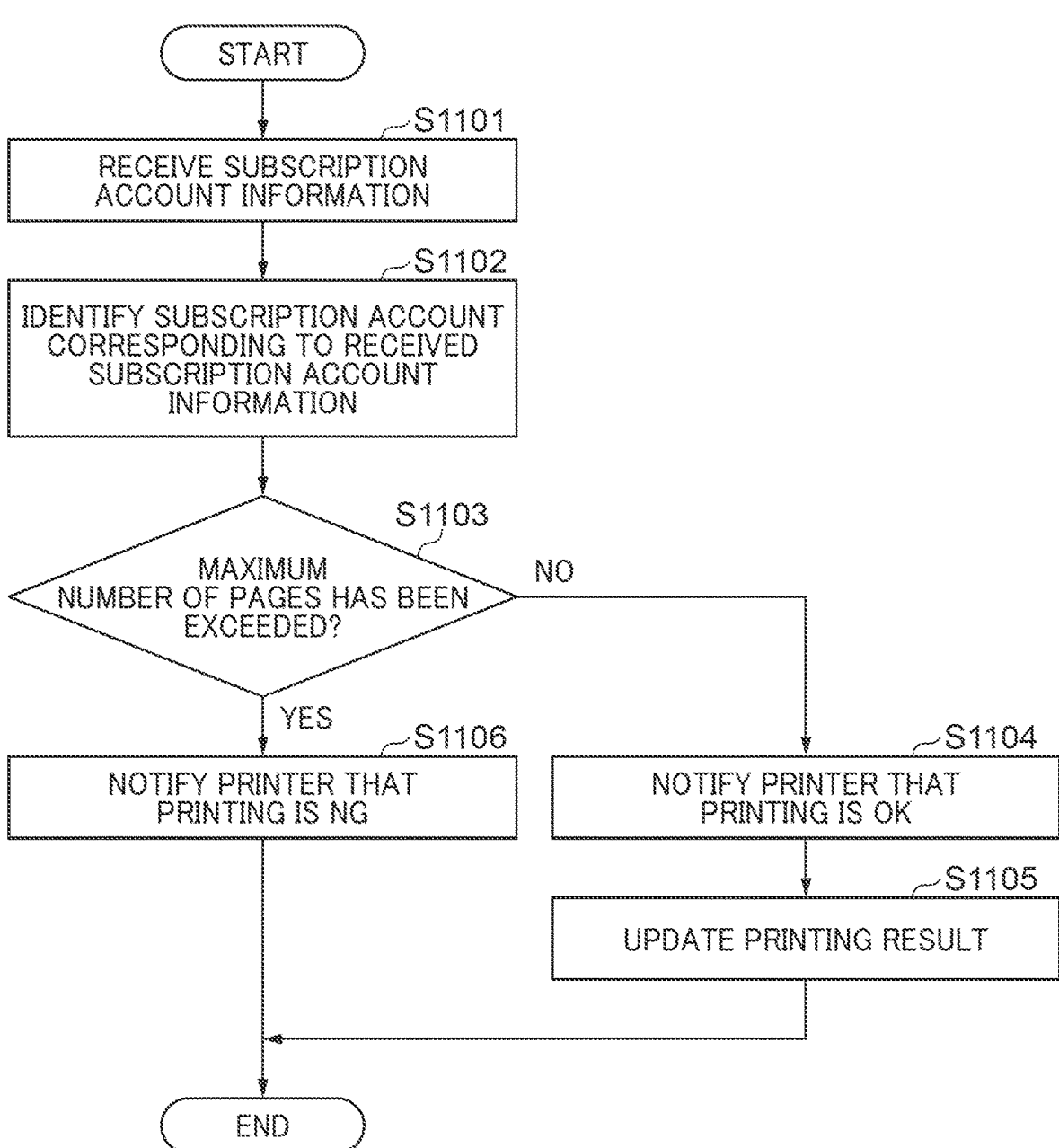
FIG. 11 is a flowchart that shows a procedure of a response processing executed by the subscription server shown in FIG. 1.

FIG. 11 is a flowchart that shows a procedure of the response processing executed by the subscription server 130 shown in FIG. 1. The response processing shown in FIG. 11 is realized by the CPU 231 reading out a software control program stored in the storage unit 223 into the memory 232 and executing it.

As shown in FIG. 11, the CPU 231 receives the subscription account information transmitted from the printer 120 in the inquiry made in S1003 (S1101). Next, the CPU 231 identifies a subscription account corresponding to the received subscription account information from among a plurality of registered subscription accounts (S1102). Next, the CPU 231 determines whether or not the maximum number of pages printable this month under the subscription plan corresponding to the identified subscription account has been exceeded (S1103).

In the case of being determined in S1103 that the maximum number of pages printable this month under the subscription plan corresponding to the identified subscription account has not been exceeded, the CPU 231 notifies the printer 120 that printing is possible (printing is OK) (S1104). Next, the CPU 231 updates a printing result of the identified subscription account (1105). For example, the CPU 231 makes an inquiry to the printer 120 about the number of printed pages, and updates the printing result based on an answer received from printer 120. It should be noted that the method of updating the printing result is not limited to this method, and for example, in S1101, the CPU 231 may receive the print job data together with the subscription account information from the printer 120, and may update the printing result based on the number of printed pages obtained by analyzing the print job data. When updating of the printing result is completed, the response processing ends.

In the case of being determined in S1103 that the maximum number of pages printable this month under the subscription plan corresponding to the identified subscription account has been exceeded, the CPU 231 notifies the printer 120 that printing is not possible (printing is NG) (S1106). After that, the response processing ends.

According to the preferred embodiment described above, the printing setting UI 700 including the subscription account information selection field 710 is displayed on the display unit 201. The subscription account information selection field 710 is an object for allowing the user to select the subscription account information, in which a printing result of printing based on the printing setting set on the printing setting UI 700 is recorded, from among the plurality of pieces of obtained subscription account information. This allows the user to select the subscription account, in which the printing result of the printing based on the printing setting set on the printing setting UI 700 is recorded, and as a result, it is possible to record the printing result in an appropriate subscription account.

In addition, in the preferred embodiment described above, in the case that the computer 100 has obtained the plurality of pieces of subscription account information, the printing setting UI 700 including the subscription account information selection field 710 is displayed on the display unit 201. This allows the user who is in a situation where the user is able to use the plurality of pieces of subscription account information to select the subscription account, in which the printing result of the printing based on the printing setting set on the printing setting UI 700 is recorded.

In addition, in the preferred embodiment described above, in the case that the print instruction includes the subscription account information selected by the user in the subscription account information selection field 710, the print job data 900 includes the subscription account information. As a result, it is possible to record the printing result of printing of the print job data 900 in the subscription account corresponding to the subscription account information selected by the user in the subscription account information selection field 710.

Although the present invention has been described above by using the preferred embodiment described above, the present invention is not limited to the preferred embodiment described above. For example, whether or not to include the subscription account information selection field 710 in the printing setting UI may be controlled based on a subscription account switching setting set in advance by the user.

Figure 12:
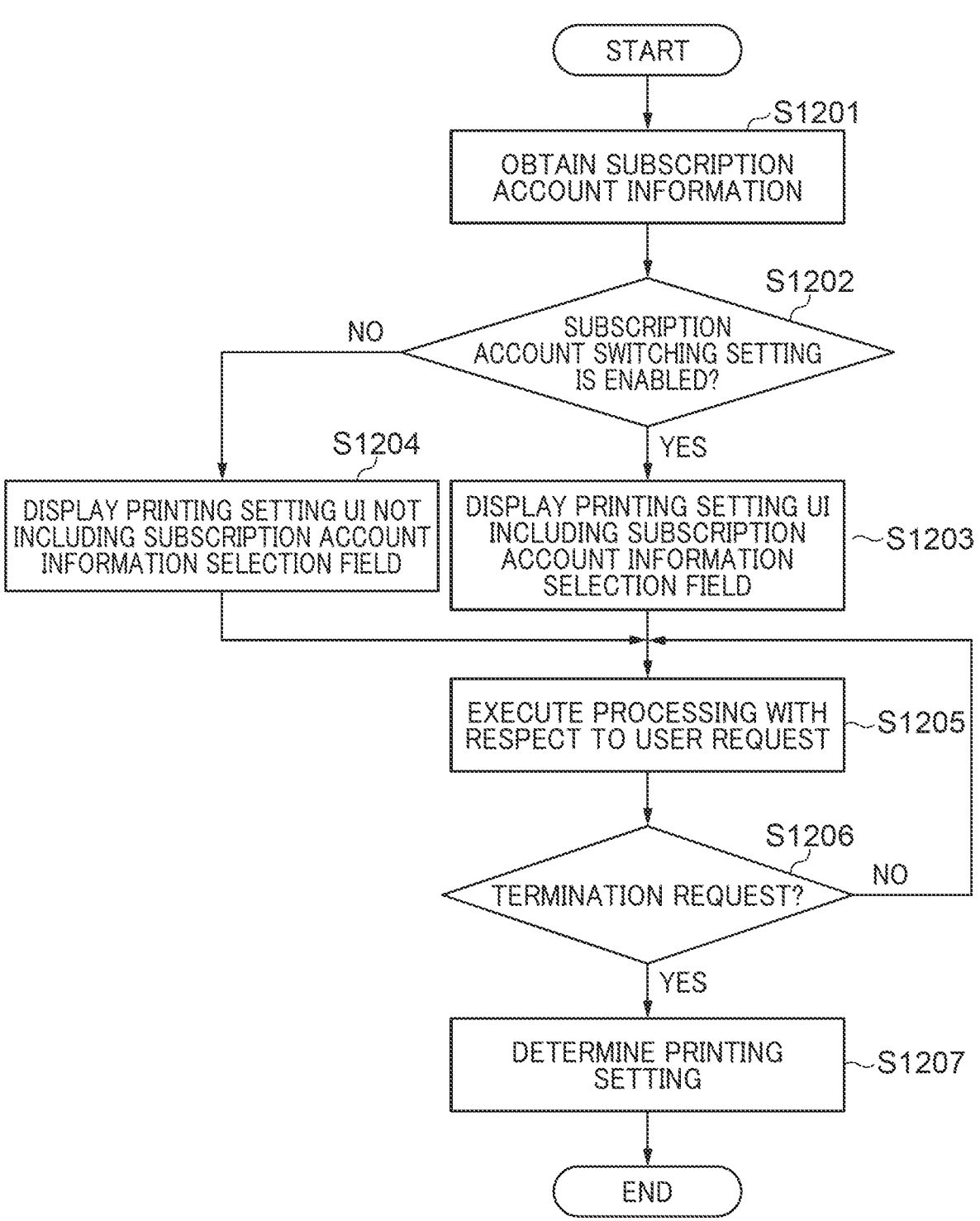
FIG. 12 is a flowchart that shows another procedure of the display control processing of the printing setting UI executed by the computer shown in FIG. 1.

FIG. 12 is a flowchart that shows another procedure of the display control processing of the printing setting UI executed by the computer 100 shown in FIG. 1. It should be noted that the display control processing shown in FIG. 12 is similar to the display control processing shown in FIG. 6 described above, and the content that is different from the display control processing shown in FIG. 6 described above will be described below. Similar to the display control processing shown in FIG. 6 described above, the display control processing shown in FIG. 12 is also realized by the CPU 211 reading out the control program for the printer driver 412 stored in the storage unit 203 into the memory 212 and executing it. In addition, similar to the display control processing shown in FIG. 6 described above, the display control processing shown in FIG. 12 is also executed when the printer driver 412 receives, via the GDI 411, a request to display the printing setting UI outputted from the application 401.

Figure 13:
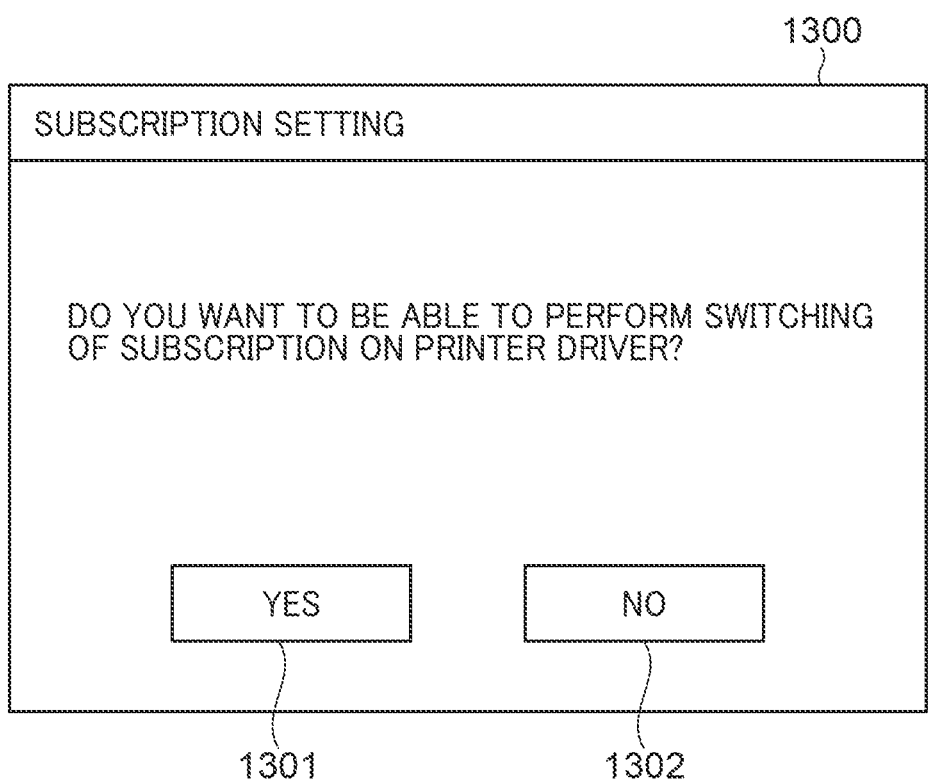
FIG. 13 is a diagram that shows an example of a setting screen displayed on the display unit shown in FIG. 2A.

As shown in FIG. 12, first, S1201, which is the same process as S601 described above, is performed. Next, the CPU 211 determines whether or not the subscription account switching setting is enabled (S1202). In this embodiment, the user is able to enable or disable the subscription account switching setting on a setting screen 1300 shown in FIG. 13 that is displayed on the display unit 201 when the printer driver 412 is installed on the computer 100. When a "YES" button 1301 is selected on the setting screen 1300, the subscription account switching setting becomes enabled. In addition, when a "NO" button 1302 is selected on the setting screen 1300, the subscription account switching setting becomes disabled. The setting value set on the setting screen 1300 is stored in the storage unit 203 or the like. It should be noted that the processing of a printer driver installer (not shown) for installing the printer driver 412 is realized by the CPU 211 reading out a printer driver installer control program stored in the storage unit 203 into the memory 212 and executing it. The printer driver installer makes it possible to install the printer driver 412 and subscribe to (contract) a subscription plan on the UI.

Returning to FIG. 12, in the case of being determined in S1202 that the subscription account switching setting is enabled, the display control processing shown in FIG. 12 proceeds to S1203, which is the same process as S603 described above. After that, S1205 to S1207, which are the same processes as S605 to S607 described above, are performed, and the display control processing shown in FIG. 12 ends.

On the other hand, in the case of being determined in S1202 that the subscription account switching setting is not enabled, that is, the subscription account switching setting is disabled, the display control processing shown in FIG. 12 proceeds to S1204, which is the same process as S604 described above, and then proceeds to S1205.

In the embodiment described above, whether or not to include the subscription account information selection field 710 in the printing setting UI is controlled based on the subscription account switching setting set in advance by the user. This allows the user's intention to be reflected in whether or not to include the subscription account information selection field 710 in the printing setting UI.

In addition, in the embodiment described above, when the printer driver 412 is installed on the computer 100, the setting screen 1300 for performing the subscription account switching setting is displayed on the display unit 201. As a result, the user is able to set the subscription account switching setting, which is required for the control for causing to record the printing result in an appropriate subscription account, when the printer driver 412 is installed on the computer 100.

In addition, in the embodiment, a configuration, in which the subscription account switching setting can be enabled or disabled at a time other than when the printer driver 412 is installed, may be adopted.

Figure 14:
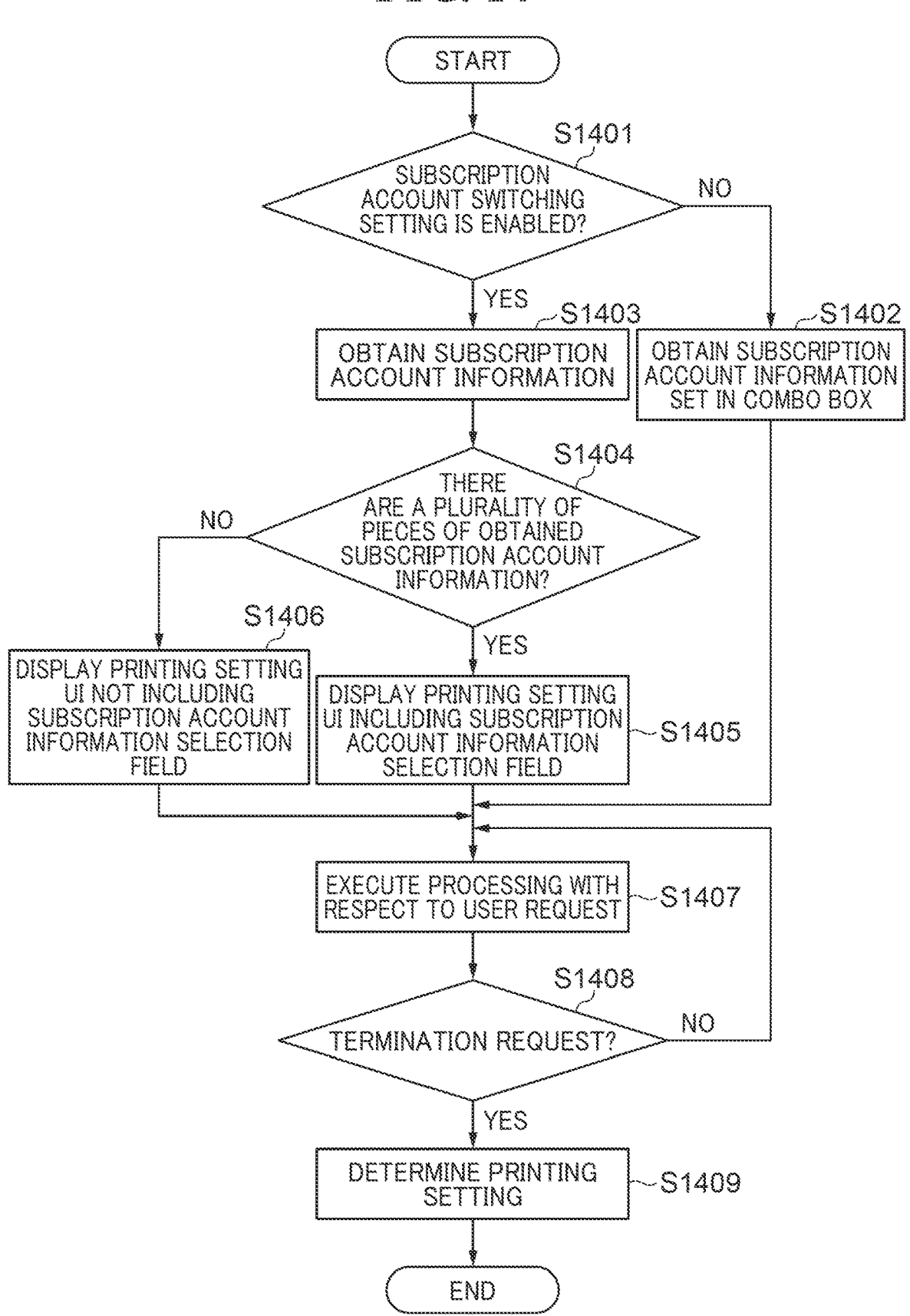
FIG. 14 is a flowchart that shows still another procedure of the display control processing of the printing setting UI executed by the computer shown in FIG. 1.

FIG. 14 is a flowchart that shows still another procedure of the display control processing of the printing setting UI executed by the computer 100 shown in FIG. 1. It should be noted that the display control processing shown in FIG. 14 is similar to the display control processing shown in FIG. 6 described above, and the content that is different from the display control processing shown in FIG. 6 described above will be described below. Similar to the display control processing shown in FIG. 6 described above, the display control processing shown in FIG. 14 is also realized by the CPU 211 reading out the control program for the printer driver 412 stored in the storage unit 203 into the memory 212 and executing it. In addition, similar to the display control processing shown in FIG. 6 described above, the display control processing shown in FIG. 14 is also executed when the printer driver 412 receives, via the GDI 411, a request to display the printing setting UI outputted from the application 401.

Figure 15:
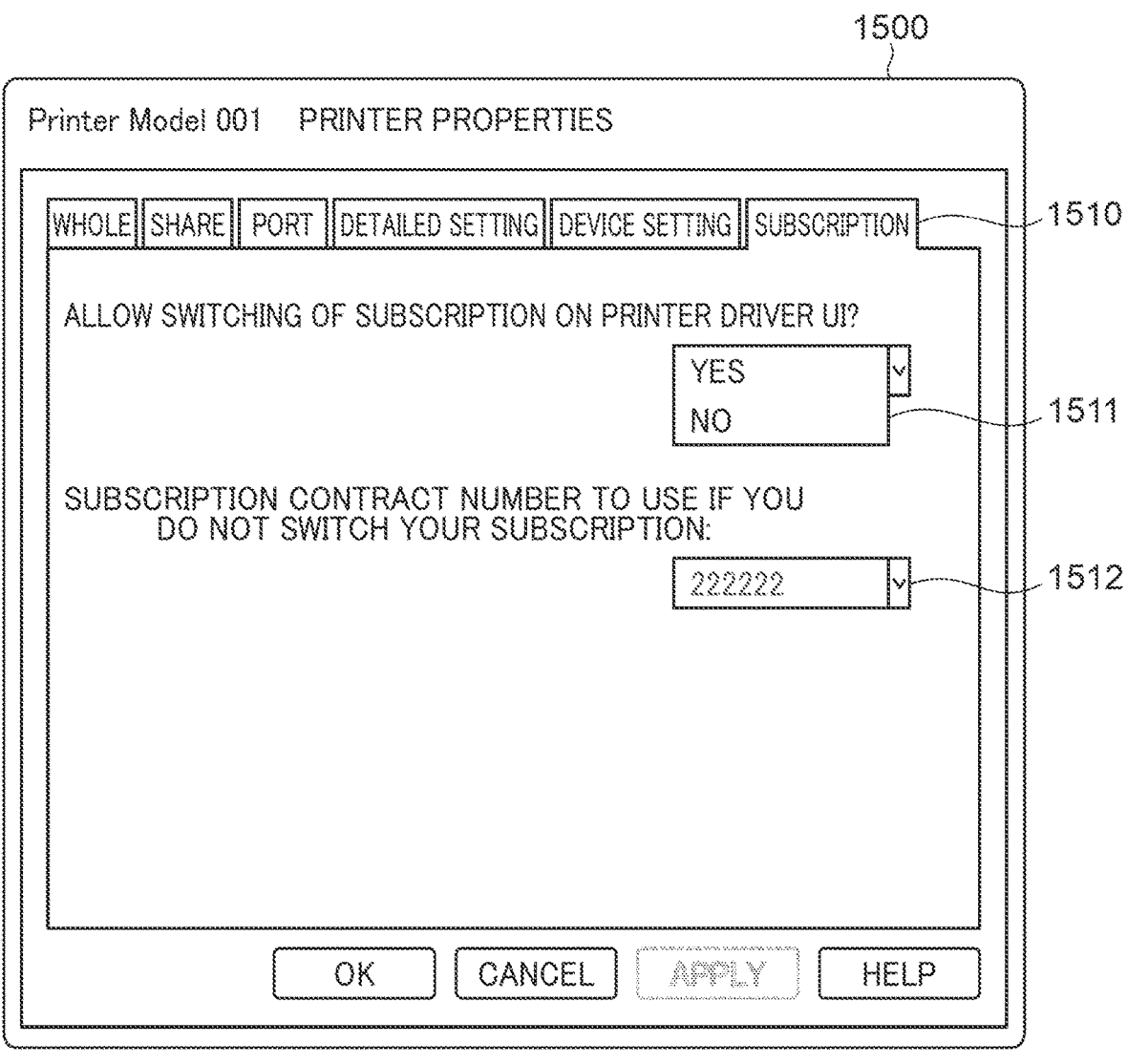
FIG. 15 is a diagram that shows an example of a printer property displayed on the display unit shown in FIG. 2A.

As shown in FIG. 14, first, the CPU 211 determines whether or not the subscription account switching setting is enabled (S1401). In this embodiment, the user is able to enable or disable the subscription account switching setting from a printer property 1500 of the printer driver 412 shown in FIG. 15. The printer property 1500 is a setting function for performing printer settings such as a printer network setting and a print setting to be used by default. The printer property 1500 can be viewed only by a user who has logged in to the computer 100 with an account that has administrator authority for the printer driver 412, and includes a plurality of tabs including a subscription tab 1510. In FIG. 15, a subscription administrator setting screen corresponding to the selected subscription tab 1510 is displayed.

On the subscription administrator setting screen, it is possible to enable or disable the subscription account switching setting. For example, in the case that "YES" in a combo box 1511 on the subscription administrator setting screen has been selected, the subscription account switching setting becomes enabled. On the other hand, in the case that "NO" in the combo box 1511 on the subscription administrator setting screen has been selected, the subscription account switching setting becomes disabled, and a combo box 1512 becomes selectable. With the combo box 1512, it is possible to select the subscription account information to be used in the case that switching of subscription accounts is not allowed, that is, it is possible to select the subscription account information to be used in the case that the subscription account information selection field 710 is not included in the printing setting UI. The setting value set on the subscription administrator setting screen is stored in the storage unit 203 or the like. It should be noted that in the embodiment, the printer property 1500 has been described as a screen that can be viewed only by the administrator of the printer driver 412, but a configuration that allows users who do not have the administrator authority for the printer driver 412 to view the printer property 1500 may be adopted. In such a configuration, when having logged in to the computer 100 with an account that does not have the administrator authority for the printer driver 412, on the printer property 1500, the combo box 1511 is grayed out so that it cannot be operated.

Returning to FIG. 14, in the case of being determined in S1401 that the subscription account switching setting is not enabled, that is, the subscription account switching setting is disabled, the display control processing shown in FIG. 14 proceeds to S1402. In S1402, the CPU 211 obtains the subscription account information set in the combo box 1512 (S1402). Next, the display control processing shown in FIG. 14 proceeds to S1407, which is the same process as S605 described above. After that, S1408 and S1409, which are the same processes as S606 and S607 described above, are performed, and the display control processing shown in FIG. 14 ends.

On the other hand, in the case of being determined in S1401 that the subscription account switching setting is enabled, the display control processing shown in FIG. 14 proceeds to S1403, which is the same process as S601 described above. After that, S1404 to S1409, which are the same processes as S602 to S607 described above, are performed, and the display control processing shown in FIG. 14 ends.

In the embodiment described above, in accordance with an instruction received from a user who has the administrator authority for the printer driver 412, the subscription administrator setting screen shown in FIG. 15 for performing the subscription account switching setting is displayed on the display unit 201. As a result, the user who has the administrator authority for the printer driver 412 is able to easily change the subscription account switching setting at a time other than when the printer driver 412 is installed. As a result, it is possible to make the subscription account switching function easier to use.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-046755, filed on Mar. 23, 2023, which is hereby incorporated by reference herein in its entirety.

What is claimed is:

1. A non-transitory computer-readable storage medium storing a printer driver that causes execution of a control method for an information processing apparatus that comprises a display unit of the and causes the display unit to display a printing setting user interface for causing a printing apparatus to execute printing, the control method comprising:

causing the information processing apparatus to obtain account information for a subscription service available to a user who operates the information processing apparatus to cause the printing apparatus to execute the printing, the obtained account information including first account information for a first subscription service and second account information for a second subscription service different from the first account information for the first subscription service;

causing the display unit of the information processing apparatus to display the printing setting user interface including (i) a plurality of settings for executing printing and (ii) an object for allowing the user to select account information, in which a printing result of the printing is to be recorded, from among the first account information for the first subscription service and the second account information for the second subscription service; and causing the printing apparatus to execute the printing based at least one setting selected from among the plurality of settings displayed on the printing setting user interface including the object for allowing the user to select the account information from among the first account information for the first subscription service and the second account information for the second subscription service.

2. The non-transitory computer-readable storage medium according to claim 1, wherein the obtained account information includes, in a case where the subscription service available to the user is a single subscription service, account information for the single subscription service available to the user who operates the information processing apparatus to cause the printing apparatus to execute the printing, the control method further comprising:

causing the display unit of the information processing apparatus to display the printing setting user interface including (i) the plurality of settings for executing the printing but not including (ii) the object for allowing the user to select the account information in which the printing result of the printing is to be recorded.

3. The non-transitory computer-readable storage medium according to claim 1, wherein in a case that a predetermined setting, which causes the user to select the account information, in which the printing result of the printing is to be recorded, from among the first account information for the first subscription service and the second account information for the second subscription service, is enabled, the display unit of the information processing apparatus is caused to display the printing setting user interface including the object.

4. The non-transitory computer-readable storage medium according to claim 3, wherein the control method further comprises: causing, when the printer driver is installed on the information processing apparatus, the display unit of the information processing apparatus to display a setting screen for enabling or disabling the predetermined setting.

5. The non-transitory computer-readable storage medium according to claim 3, wherein the control method further comprises:

causing, in accordance with an instruction received from a user who has administrator authority for the printer driver, the display unit of the information processing apparatus to display a setting screen for enabling or disabling the predetermined setting.

6. The non-transitory computer-readable storage medium according to claim 1, wherein the control method further comprises:

including, in a case that the account information for the subscription service selected by the user on the object is included in a print instruction based on the at least one setting selected from among the plurality of settings displayed on the printing setting user interface, the account information for the subscription service, which has been selected by the user on the object, in print job data for causing the printing apparatus to execute the printing; and transmitting the print job data to the printing apparatus.

7. An information processing apparatus that includes a display unit and causes the display unit to display a printing setting user interface for causing a printing apparatus to execute printing, the information processing apparatus comprising:

at least one processor; and a memory coupled to the at least one processor and storing instructions that, when executed by the at least one processor, cause the at least one processor to:

obtain account information for a subscription service available to a user who operates the information processing apparatus to cause the printing apparatus to execute the printing, the obtained account information including first account information for a first subscription service and second account information for a second subscription service different from the first account information for the first subscription service;

cause the display unit to display the printing setting user interface including (i) a plurality of settings for executing printing and (ii) an object for allowing the user to select account information, in which a printing result of the printing is to be recorded, from among the first account information for the first subscription service and the second account information for the second subscription service; and cause the printing apparatus to execute the printing based at least one setting selected from among the plurality of settings displayed on the printing setting user interface including the object for allowing the user to select the account information from among the first account information for the first subscription service and the second account information for the second subscription service.

8. A control method for an information processing apparatus that includes a display unit and causes the display unit to display a printing setting user interface for causing a printing apparatus to execute printing, the control method comprising:

obtaining account information for a subscription service available to a user who operates the information processing apparatus to cause the printing apparatus to execute the printing, the obtained account information including first account information for a first subscription service and second account information for a second subscription service different from the first account information for the first subscription service;

causing the display unit to display the printing setting user interface including (i) a plurality of settings for executing printing and (ii) an object for allowing the user to select account information, in which a printing result of the printing is to be recorded, from among the first account information for the first subscription service and the second account information for the second subscription service; and causing the printing apparatus to execute the printing based at least one setting selected from among the plurality of settings displayed on the printing setting user interface including the object for allowing the user to select the account information from among the first account information for the first subscription service and the second account information for the second subscription service.

* * * * *